March 6, 1951  D. F. McCULLAR  2,543,921
KNEE ACTING ADJUSTABLE FENDER
Filed Dec. 4, 1945
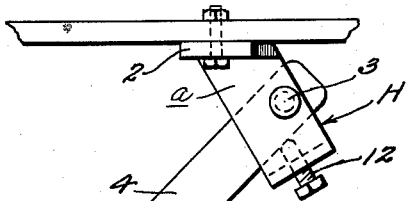
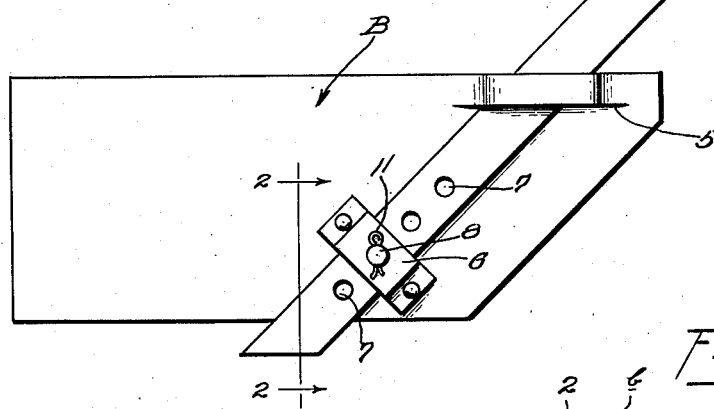
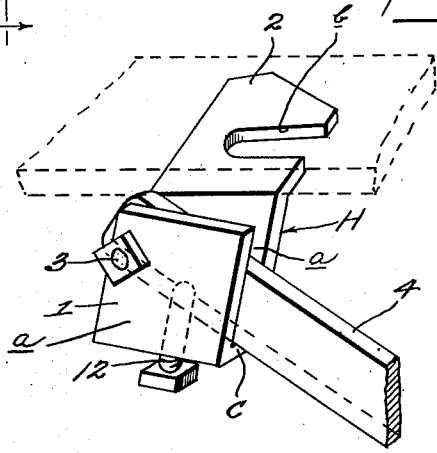
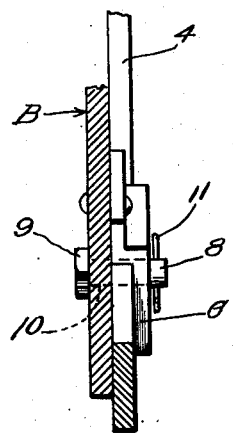
INVENTOR.
David F. McCullar
BY
Wilfred E. Lawson
ATTORNEY Patented Mar. 6, 1951

2,543,921

UNITED STATES PATENT OFFICE 2,543,921

KNEE ACTING ADJUSTABLE FENDER

David F. McCullar, Lawrenceburg, Tenn.

Application December 4, 1945, Serial No. 632,709

1 Claim. (Cl. 97—188)

This invention relates to fenders of a type to be used in connection with any kind of farm implement to prevent plows or tines from covering small plants or row crops and it is a particular object of the invention to provide a device of this kind which may be quickly applied or removed.

It is also an object of the invention to provide a fender including a blade mounted in a manner to allow vertical adjustment whereby it is possible to shut off all dirt from row or plants or to gauge the dirt permitted to reach the plant or row within certain limitations.

A still further object of the invention is to provide a fender including a blade mounted in a manner to permit such movement or vibration of the fender to prevent dirt from accumulating between the fender and the plow or tines, thus aiding in a smoother distribution of dirt under the blade preventing clogging of the dirt.

An additional object of the invention is to provide a device of this kind including a blade and neck therefor and wherein the neck drags on the ground and thereby forming a brace against the soil being cultivated to prevent the blade from being forced inwardly toward the plant or row and to maintain the blade perpendicular.

The invention also has for an object to provide a device of this kind including a blade which is mounted in a manner whereby such blade is held in effective working position by gravity and can easily mount over obstructions that might be in its path of travel.

The invention consists in the details of construction and in the combination and arrangement of the several parts of my improved knee acting adjustable fender whereby certain important advantages are attained, as will be hereinafter more fully set forth.

In order that my invention may be better understood, I will now proceed to describe the same with reference to the accompanying drawings, wherein:

Figure 1 is an elevational view of a fender constructed in accordance with an embodiment of the invention;

Figure 2 is a fragmentary sectional view taken substantially on the line 2—2 of Figure 1; and Figure 3 is a fragmentary perspective view of the upper portion of the arm and hanger carried thereby.

In the embodiment of the invention as illustrated in the accompanying drawings, H denotes a hanger including a U bracket 1, having a side plate a, the free end of which is provided with an outwardly and laterally disposed flat ear 2 having an open slot b in a side marginal portion thereof whereby the hanger may be easily and quickly applied to or removed from the farm machine. It is to be pointed out that the bracket 1 is on an angle of approximately forty-five degrees with respect to the ear 2.

Extending between the side plates a of the bracket 1 and pivotally held thereto, as at 3, is an end portion of a long straight arm member 4 which readily swings downwardly by gravity and which is of a length to contact the ground surface when the device is applied whereby said arm member constitutes a brace.

This arm member is flat and relatively thin and carried by the lower or outer end portion thereof is the blade B which extends fore and aft of the arm member and in close contact therewith.

The blade B is flat and substantially rectangular in form with its forward end edge disposed on an upward and forward incline of about forty-five degrees to the longitudinal axis of the blade. The upper marginal portion of the blade and closely adjacent to the forward end is provided with a longitudinal slot 5 through which freely passes from the inner side of the blade B, the arm member 4.

Carried by the outer face of the blade B at the lower forward portion thereof is a rigid loop or holding member 6 through or under which passes the lower or outer end portion of the arm member 4. The lower part of the arm member 4 is provided therealong with the spaced opening 7 through a selected one of which is inserted a pin or shank 8 whereby the blade B is held in desired position on the arm member 4 and in a manner whereby said blade may oscillate or vibrate as allowed by the slot 5. This pin or shank 8 has a thin flat head 9 which closely contacts the inner face of the blade B. This pin or shank 8 is also disposed through the aligned openings 10 in the blade B and member 6, and insertible through the pin or shank 8 outwardly of said member 6 is a cotter pin 11 or the like.

The arm member 4 extends downwardly and connects with the ground surface on the same angle as the bracket 1 with respect to the ear 2. This assures the blade B being so held as to easily mount over an obstruction which might be in its path of travel.

The blade B is of sufficient length, preferably sixteen inches, to guard the row or plants against dirt being thrown by a plow, a gang of tandam plows, or tines, and to regulate the amount of dirt being shifted under the blade B to the row or plants.

The arm member 4, when the fender is applied, contacts at all times with the ground and cuts a groove into the ground or soil and thus provides a brace for the blade B to help prevent the weight of the dirt thrown by the plow or tines from forcing the blade B inwardly or toward the row or plants. Furthermore, this connection of the arm member with the ground or soil below the blade B, provides a dragging action over the ground surface which causes a continuous rocking movement or vibration of the blade B which aids in shedding dirt that may accumulate between the blade B and the plow or tines.

The openings 7 in the arm member 4 permit adjustments upwardly or downwardly of the blade B on said arm member to permit a shutting off of all dirt from the row or plants or gauging the dirt permitted to reach the row or plants as desired within certain limitations.

Most modern farm implements have a convenient bolt or nut for attaching the hanger H but where no such attaching convenience is present, a clamp or cuff can be successfully used on beams or extensions of such implements.

In modern farming methods, many row crops are planted in what is known as a "water furrow," or in a deep furrow, seeds being planted at the bottom of such furrows and covered with a small amount of dirt by a mechanical planter. Obviously the plants are below the surface of the ground and such crops require cultivating before the plants reach the height of the surrounding ground surface. The fender as herein embodied is of particular advantage under this condition as it can drop down on the furrow and protect the plants from being covered up by dirt.

It is also to be particularly pointed out that the arm member 4 by having connection with the ground or soil supports the weight of the dirt thrown by the plow or tines and that the fender protects the row crop at the stage at which protection is needed. The fender as herein comprised assures a uniform spread of dirt to the plants and thereby aids in uniform cultivating. Furthermore, the fender is flexible at all times regardless of the depth or shallowness of the plow.

The fenders are to be produced in rights and lefts and it is further pointed out that the structure of the fender is such that the blade at all times is substantially parallel to the ground surface thus assuring a maximum of efficiency.

Threading through the intermediate or connecting portion c of the bracket 1 is a set-screw 12 for coaction from below with the arm member 4. This limits the extent of downward movement of the arm member 4 toward the portion c of the bracket 1.

From the foregoing description it is thought to be obvious that a knee acting adjustable fender constructed in accordance with my invention is particularly well adapted for use by reason of the convenience and facility with which it may be assembled and operated.

I claim:

A fender for an earth working machine comprising a relatively long arm, means for attaching the arm at one end to the machine to extend downwardly therefrom to the ground, a relatively long flat blade adapted to have a vertical working position with a longitudinal edge in contact with the ground, said arm extending obliquely across a side face of the blade, means securing the arm and blade together, said arm having its lower end extending below the said one longitudinal edge of the blade, the said means securing the arm and blade together being designed to facilitate disconnection of the arm from the blade, the said securing means comprising a guide carried by the blade through which the arm extends, the arm having a series of apertures therethrough and disposed longitudinally thereof, a pin member adapted to pass through the blade and guide and a selected one of said apertures, and a second guide for the arm, the second guide comprising a relatively long strip of the blade material struck from the blade to have a laterally offset parallel relation therewith, the first mentioned guide being adjacent to the lower edge of the blade and the second mentioned guide being adjacent to the top edge thereof, and said arm passing between said offset strip and the adjacent face of the blade.

DAVID F. McCULLAR.

REFERENCES CITED

The following references are of record in the file of this patent:

UNITED STATES PATENTS

| Number | Name | Date |
| --- | --- | --- |
| 103,203 | Lanay | May 17, 1870 |
| 684,507 | Goss | Oct. 15, 1901 |
| 787,977 | Edwards | Apr. 25, 1905 |
| 937,674 | Browning | Oct. 19, 1909 |